United States Patent [19]

Kar

[11] Patent Number: 4,641,976
[45] Date of Patent: Feb. 10, 1987

[54] COPPER-BASED SPINODAL ALLOY BEARINGS

[75] Inventor: Nareshchrandra J. Kar, Westminster, Calif.

[73] Assignee: Smith International, Inc., Newport Beach, Calif.

[21] Appl. No.: 794,358

[22] Filed: Nov. 1, 1985

Related U.S. Application Data

[63] Continuation of Ser. No. 578,398, Feb. 9, 1984, abandoned.

[51] Int. Cl.$^4$ .................. E21B 10/22; F16C 17/12; F16C 33/12
[52] U.S. Cl. .................. 384/95; 175/371; 384/913
[58] Field of Search .............. 384/95, 92, 96, 276, 384/912, 913; 308/DIG. 8, DIG. 9; 175/371; 148/412, 414

[56] References Cited

U.S. PATENT DOCUMENTS 1,928,747  10/1933  Wise .
3,674,575   7/1972  Prill et al. .
3,721,307   3/1973  Mayo .
3,937,638   2/1976  Plewes .
3,995,917  12/1976  Quinlan .
4,012,238   3/1977  Scales .
4,052,204  10/1977  Plewes .
4,090,890   5/1978  Plewes .
4,105,263   8/1978  Sorensen et al. .
4,142,918   3/1979  Plewes .
4,260,432   4/1981  Plewes .

OTHER PUBLICATIONS

Lefeure et al, Age Hardening in Cu–15Ni–8Sn Alloy, 1978, "American Society for Metals and the Metallurgical Society of AIME.

Primary Examiner—Stuart S. Levy
Assistant Examiner—Lynn M. Sohacki
Attorney, Agent, or Firm—Robert G. Upton

[57] ABSTRACT

This invention relates to the use of spinodal alloys consisting essentially of copper-nickel-tin for bearing surfaces formed between roller cutter cones of sealed bearing rock bits.

6 Claims, 8 Drawing Figures

COPPER-BASED SPINODAL ALLOY BEARINGS

CROSS-REFERENCE TO RELATED APPLICATION

This application is a continuation of co-pending application Ser. No. 578,398 now abandoned, filed on Feb. 9, 1984.

BACKGROUND OF THE INVENTION

2. Field of the Invention

This invention pertains to heavy-duty, friction type bearings.

More specifically, this invention pertains to friction bearings utilized in sealed bearing roller cone rock bits.

The bearings of roller cone rock bits typically carry heavy loads (up to 40,000 pounds), plus intense and continuous shock loads during bit operation. Relative sliding velocities between the cone bearing surface and its associated journal bearing run from fifty to as much as five hundred surface feet per minute. Lubrication is typically limited to self-contained noncirculating grease and bit operating temperatures, run between 150° and 400° Fahrenheit.

3. Description of the Prior Art

In the past, many materials and material systems have been used in the production of friction bearings for roller cone rock bits.

U.S. Pat. No. 3,721,307, for instance, specifies the use of beryllium copper in a rock bit bearing. Porous steel bearings produced from powdered metal and containing lubricants, such as graphite, in their interstices are described in U.S. Pat. No. 4,105,263. Bearings wherein the steel members are treated to produce a special surface are also well known in the art. For example, U.S. Pat. No. 4,012,238 describes a treatment involving the combined use of boronizing and carburizing to produce a hardened "case" which is used as a bearing surface. U.S. Pat. No. 3,995,917, assigned to the same assignee as the present invention, describes the use of aluminum bronze in the production of a rock bit friction bearing. Tungsten carbides have also been used, as have stellite and other hard materials which are applied by metallurgical hardfacing methods.

The useful life expectancy of these various systems varies according to the particular drilling conditions under which they are used but are typically about 100 hours. Depending upon these conditions, lifetimes of from 20 hours to about 150 hours are common.

SUMMARY OF THE INVENTION

It is an object of this invention to provide a friction bearing for a roller cone rock bit which will exhibit superior bearing qualities, resulting in longer bit life.

A small family of highly specialized alloys, called copper-based spinodal alloys, developed in an art remote to either bearings or especially roller cone rock bits, have been discovered to possess physical properties advantageous to the production of rock bit friction bearings. Spinodal alloys, in most cases, exhibit an anomaly in their phase diagram called a miscibility gap. Within the very narrow temperature range of the gap, atomic ordering takes place within the existing crystal lattice structure. The resulting two-phase structure is stable at temperatures significantly below the gap. A cast or wrought material is first solution heat treated, permitting partial or full homogenization and annealing of the material, followed by a high-speed quench to freeze the fine grain structure. Subsequently, the material is age-hardened by raising the material to a temperature within the miscibility gap. A chemical segregation takes place called "spinodal decomposition" wherein two new phases form, of similar crystallographic structure but of different composition.

An intermediate cold-working stage is sometimes introduced between the initial homogenization step and the final age-hardening to increase the dislocation density of the alloy.

Spinodal decomposition does not change the crystal structure of the lattice; hence there are no changes in part dimensions during this process. So processed, spinodal alloys offer high levels of tensile strength, elastic limit, resistance to stress relaxation and fatigue strength.

We have discovered that copper-based spinodal alloys exhibit tribological properties that facilitate their application in lubricated, as well as non-lubricated, bearing applications as will become evident from the text of this disclosure. The primary family of copper-based spinodal alloys that have performed in a superior manner in our testing are copper-nickel-tin type spinodal alloys. These alloys consist primarily of copper containing nickel in an amount of from 2 to 20 percent by weight and tin in an amount of from 2 to 8 percent by weight. Our preferred compositions are: (1) copper with 10 percent nickel and 8 percent tin and (2) copper with 15 percent nickel and 8 percent tin. It is evident that other spinodal alloys within the range of compositions could be used for similar superior bearing properties. It is also obvious that other families of copper-based spinodal alloys where the nickel and/or tin are replaced by elements such as chromium or iron would perform as spinodal bearings.

We also disclose that copper-nickel-tin spinodal alloys that contain one or more additional elements such as iron, zinc, niobium, magnesium, zirconium, chromium or aluminum in total amount(s) not to exceed 15 percent by weight, would perform in a superior manner in bearing tests.

It would also be obvious that small additions of lead and/or sulfur to improve the lubricity and machinability of the disclosed copper-based spinodal alloys would perform suitably in this disclosure.

Copper-nickel-tin spinodal alloys, hereafter abbreviated as Cu—Ni—Sn type spinodal alloys, were developed by Bell Telephone Laboratories to provide a material of unusually high strength, simultaneously with a material which for many years could resist corrosion and erosion in a marine or submarine environment.

A series of United States patents relating to the making and processing of Cu—Ni—Sn type spinodal alloys have been assigned to Bell Telephone Laboratories. Those patents of particular interest include the following: U.S. Pat. No. 3,937,638 (METHOD FOR TREATING COPPER-NICKEL-TIN ALLOY COMPOSITIONS AND PRODUCTS PRODUCED THEREFROM), U.S. Pat. No. 4,052,204 (QUATERNARY SPINODAL COPPER ALLOYS), U.S. Pat. No. 4,090,890 (METHOD FOR MAKING COPPER-NICKEL-TIN STRIP MATERIAL) and U.S. Pat. No. 4,142,918 (METHOD FOR MAKING FINE-GRAINED Cu—Ni—Sn ALLOYS).

None of the above patents suggest the use of these spinodal alloys for bearing applications. More importantly, none of the above patents suggest the use of these spinodal alloys as bearing materials for roller cone rock bits, a particularly harsh environment for any type of bearing material.

The singular most unique feature of the Cu—Ni—Sn spinodal alloys shows up during the aging process. Tensile strength and ductility, normally mutually exclusive properties, are both very high after aging. The degree to which the tensile strength is increased in aging is highly dependent upon the degree of cold-working to which the material is subjected after its solution treatment. The tensile strength can go as high as 200,000 pounds per square inch. Surprisingly, during this process, very little of the ductility is lost.

In a comprehensive comparative program of laboratory testing on standard bearings, the Cu—Ni—Sn spinodal candidates performed favorably above the beryllium copper candidate.

The heat treatment schedules typically used to induce spinodal decomposition of the Cu—Ni—Sn alloys were as follows. Cast or wrought materials were first solution heat treated between 725° and 825° Centigrade for 30 to 120 minutes to homogenize the alloys, followed by water quenching. The alloys were then aged between 350° and 425° Centigrade for between 3 to 5 hours to spinodally decompose the alloys, rendering materials of high hardness and high ductility.

An obvious advantage of the use of Cu—Ni—Sn spinodal alloys is superior ductility. For example, beryllium copper has about a 38 Rockwell C (HRC), about the same as the Cu—Ni—Sn spinodal alloys, but the spinodal materials are much more ductile-a parameter that is highly desirable in bearing materials.

In addition, beryllium copper is more susceptible to stress corrosion cracking and corrosion-related failures than the Cu—Ni—Sn spinodal alloys. Such environments are commonly found in drill bit applications, such as, chlorides, sulfates, silicates, etc. These corrosive environments (abrasion, adhesion and corrosion) combined accelerate corrosive wear and shorten the life of the bearing.

These types of tribological failures have been shown to be directly attributable to the ductility and toughness of any kind of bearing material.

Being less ductile, beryllium copper is also more susceptible to surface cracking and galling.

Cu—Ni—Sn spinodal alloys exhibit superior elongation properties as well as greater ductility and toughness. The materials also have excellent resistance to applied stresses, thereby controlling erosion, cracking, etc.

Cu—Ni—Sn type spinodal materials, therefore, have a particular application in rotary cone rock bits. The rock bit bodies are generally fabricated from metal with at least one leg depending from the bit body. A journal shaft depends from the leg. A metal roller cutter cone is adapted to be rotatively secured to the journal shaft. A bearing material is disposed between the journal and the roller cutter. The bearing material consists essentially of copper-nickel-tin type spinodal alloys.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
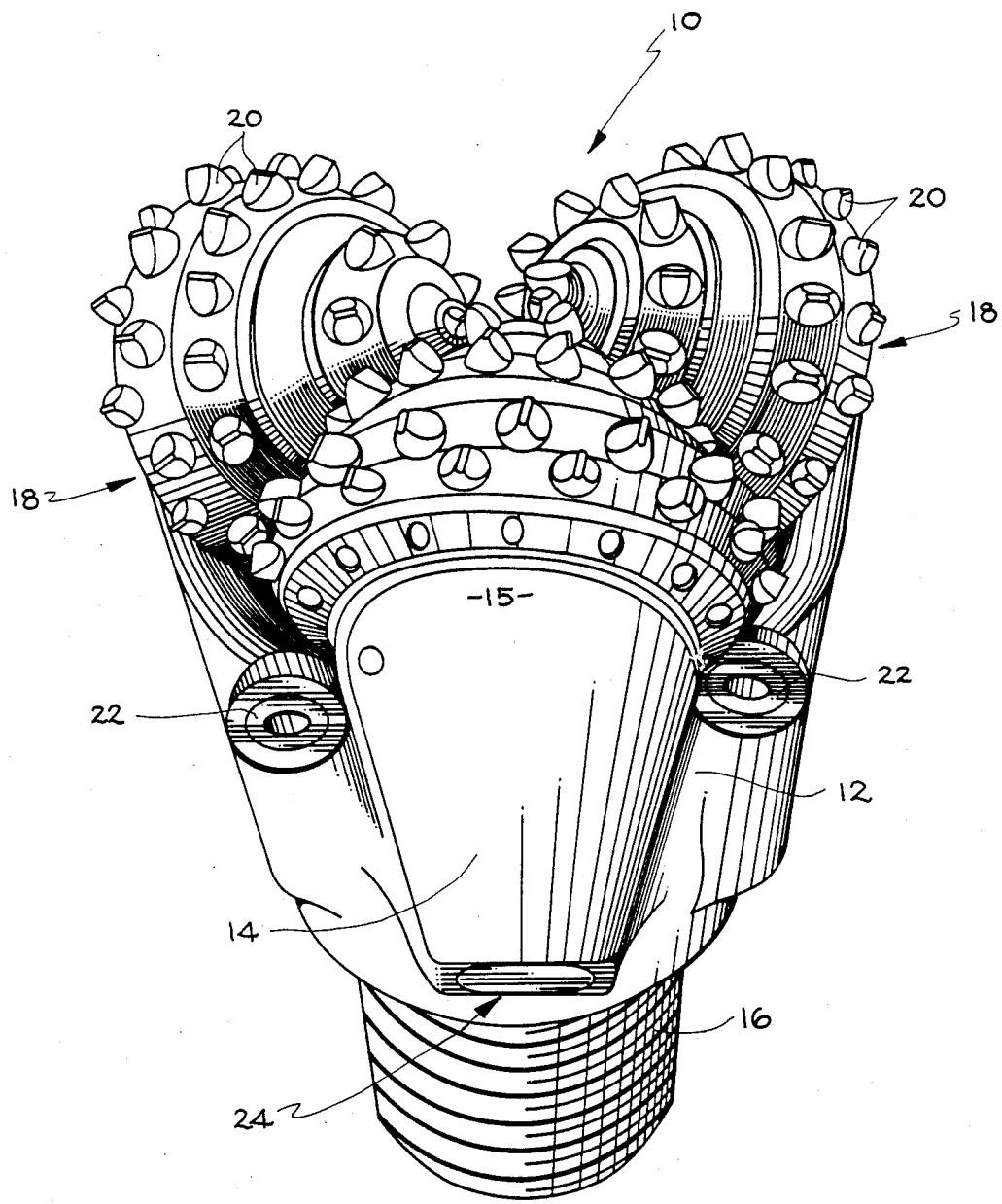
FIG. 1 is a perspective view of a typical three cone rock bit.

With reference to FIG. 1, a roller cone rock bit, generally designated as 10, is depicted. A bit body 12 defines a pin end 16, adapted to receive drill segments (not shown) that make up a typical drillstring in a drilling operation. A series of legs 14 depend from the bit body 12. Each of the legs 14 support a roller cone, generally designated as 18. A multiplicity of cutter type elements 20 are strategically positioned on the cones to describe a specific cutting pattern in a borehole during bit operation. The types of cutters illustrated in FIG. 1 are tungsten carbide inserts that are pressed into drilled holes in the cone body. One or more nozzles 22 are positioned in the bit body 12 to pass drilling mud into the borehole bottom through each of the nozzles. A grease reservoir system, generally designated as 24, provides a reservoir of lubricant (52) to the sealed bearings formed between the cones 18 and their respective journals 30.

Figure 2:
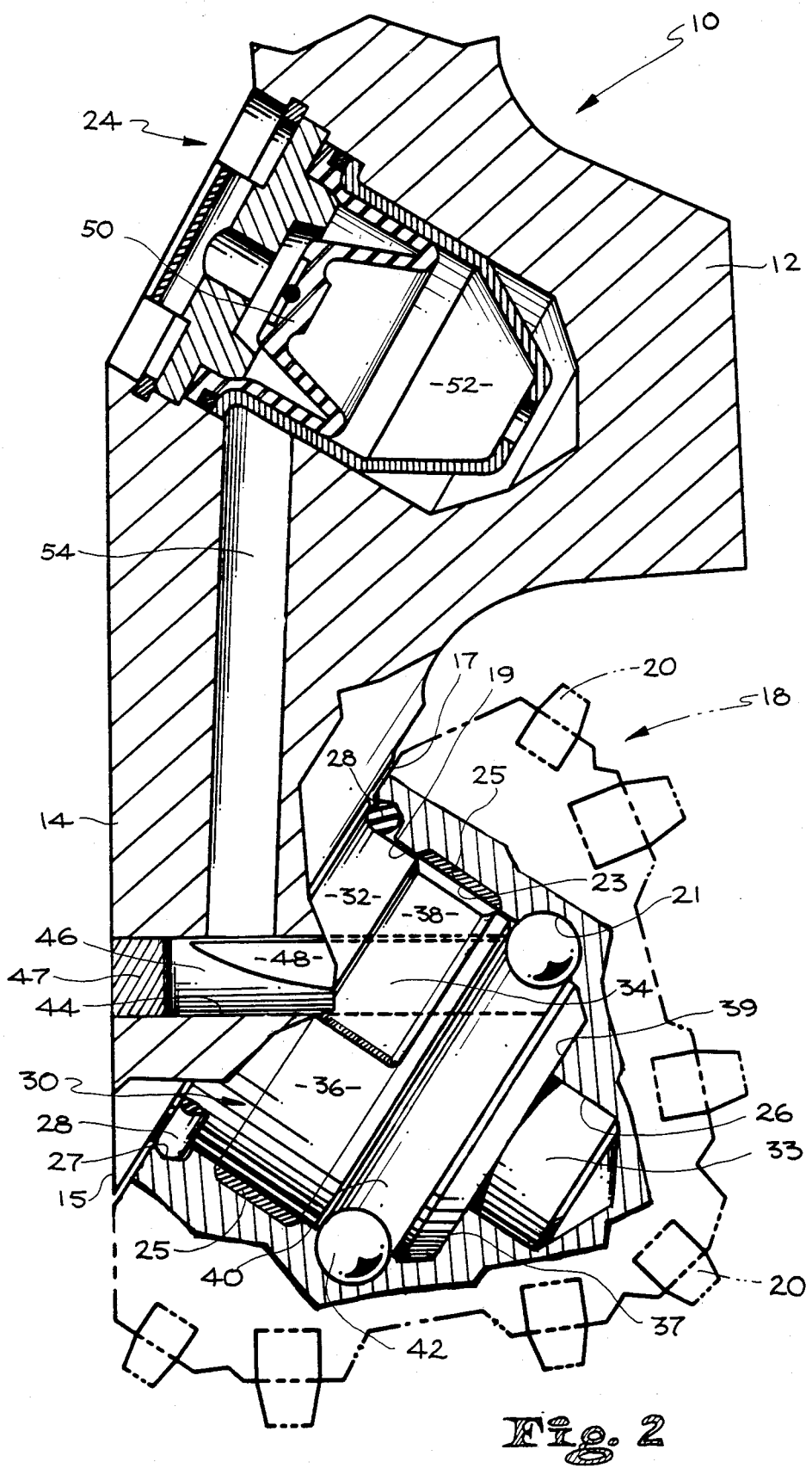
FIG. 2 is a partially broken away cross section of one leg of the rock bit of FIG. 1, illustrating the roller cone mounted to a journal bearing with a lubrication system communicating with the bearing surfaces defined between the journal bearing and the cone.

With reference now to FIG. 2, one of the sectioned legs 14 illustrates the lube reservoir system 24. The system includes a pressure compensator boot 50 to accommodate for differential pressures between the outside of the bit and the internal bearing surfaces of the bit. The reservoir system includes a channel 54 to direct lubricant from the reservoir to the bearings defined between the cone and the journal. The leg 14 terminates in a shirttail portion 15 (shown in both FIGS. 1 and 2). A journal, generally designated as 30, is cantilevered from the leg 14 toward the center of the bit. A ball race 40, transverse to the axis of the journal 30, is so positioned to register with a complementary ball race 21, formed in the cutter cone 18. A multiplicity of cone retention balls 42 are inserted through a ball hole 44. The ball hole is drilled from the outside shirttail portion 15 through the journal 30 to intersect the ball race 40. When the ball race 40 is filled with the balls 42, a ball plug 46 is then inserted in the ball hole 44 and secured by a welded cap 47. A relief portion 48 is formed in the ball plug 46 to admit lubricant from the grease reservoir chamber 52 to bearing surfaces formed between the journal and the cone.

In FIG. 2, the journal 30 further forms a channel 34 in the journal bearing surface 32. The bottom or load side of the journal 30 is filled with a hardfacing material 36 (for example, a stellite material). The upper portion of the channel 34 is left as a grease reservoir space 38 to provide a supply of lubricant to the bearing surfaces.

The cone, generally designated as 18, defines an internal cavity 19 that serves as a cone bearing surface. A spindle bearing surface 26 is further formed within the cone 18 to complement a spindle bearing 33 that extends from the end of the journal bearing. The cone is, for example, fabricated from a metal, such as steel. The cone surface is machined and drilled to accept a multiplicity of, for example, tungsten carbide inserts 20 that are interference fitted within the drilled holes in the cone. The surface of the cone could, however, be machined to form equidistantly spaced milled teeth that form the cutting edge of each of the cones. A seal gland 27 may, for example, be cut into the entrance of the bearing surfaces in the cone 18, the seal gland being so configured to accept an O-ring type seal 28. The O-ring forms a seal between the seal gland 27 and the journal bearing 34. Any type of seal may, however, be utilized without departing from the intent of the invention. A circumferential groove 23 is formed within the bearing surface 19 of cone 18, the groove generally registering with the groove 34 in journal 30. The groove 23 is subsequently filled with a Cu—Ni—Sn spinodal material which is metallurgically bonded within the annular groove 23 within cone 18. The spinodal material, as heretofore stated, provides a good bearing surface after machining that is both tough and ductile to enhance the longevity of the rock bit as it works in a borehole. The machined spinodal bearing surface runs against, for example, the hard stellite material 36 that is metallurgically bonded within the groove 34 in the journal. The rock bit, as it works in a borehole, exerts pressure to the loaded side of the journal, thus contacting the spinodal bearing material bonded to the cone against the hardened surface 36 within the load side of journal 30.

Another bearing surface, known as a "snoochie", is formed in the journal 30. The snoochie surface provides an in-thrust bearing surface that mates with a complementary surface 39 formed in the cone cavity. Although it is not illustrated, it would be obvious to use a spinodal material such as Cu—Ni—Sn alloy on the snoochie bearing surface formed on the journal or the complementary thrust bearing surface in the cone without departing from the teachings of this invention.

Figure 3:
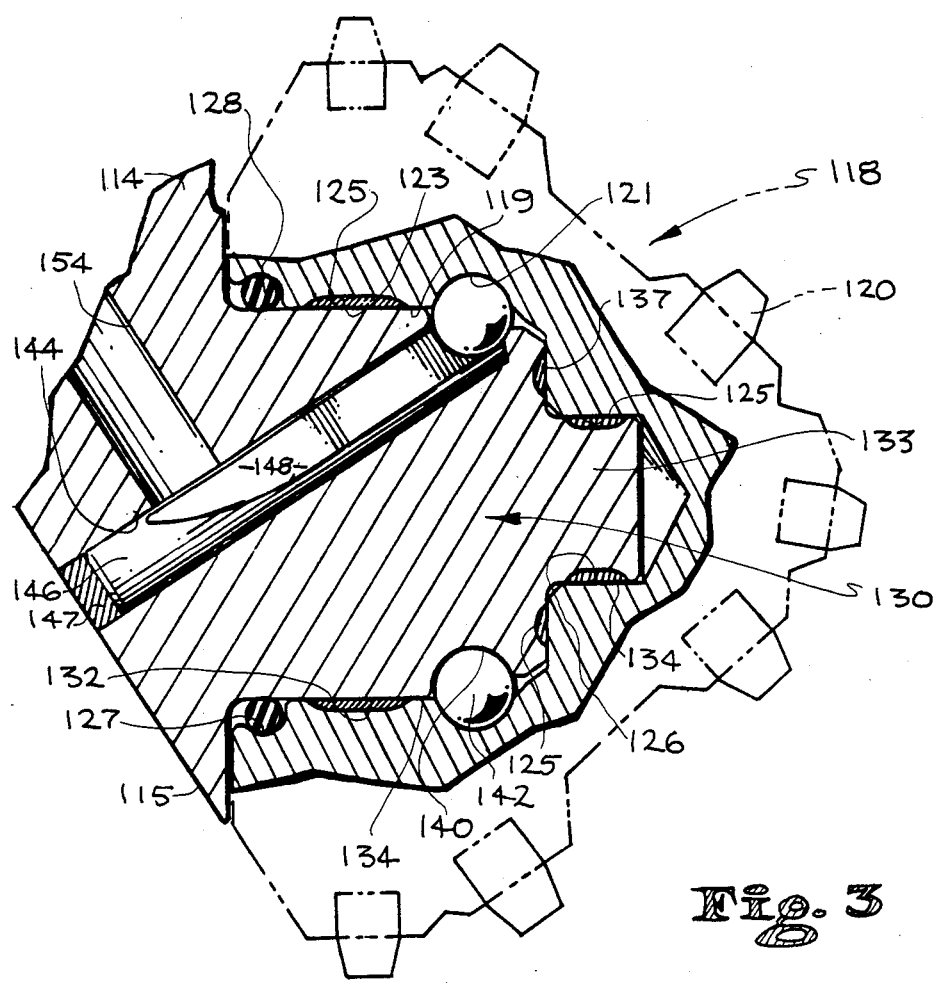
FIG. 3 is a partially broken away leg of a rock bit, illustrating a journal bearing shaft and a cone mounted to the shaft with a metallurgically bonded layer of Cu—Ni—Sn spinodal alloy in the bearing surfaces defined by the cone.

With reference now to FIG. 3, another embodiment of the present invention is depicted wherein the journal, generally designated as 130, is dependent from a leg 114. The bearing surface 132, however, lacks a circumferential annular groove in the journal as depicted in FIG. 2. The journal is machined to provide a bearing surface 132 in the parent material of the leg. The cone 118 has an annular groove 123, machined in the bearing surfaces 119, the groove being filled with a Cu—Ni—Sn spinodal alloy material 125 in the same manner as was done with the cone of FIG. 2. The spinodal material is subsequently machined and provides a primary bearing surface for the bearing 132 of journal 130.

Journal bearing 130 has a spindle 133 extending from the thrust bearing end 137 (snoochie) of the journal. A spindle bearing surface 134 runs against complementary bearing surface 126 in cone 118. Either the spindle or the cone could have a channel filled with a Cu—Ni—Sn spinodal material 125 to provide a superior bearing surface between the spindle and the cone. A series of cone retention balls 142 are confined within ball races 140/121 in journal 130 and cone 118. A similar ball plug 146 is housed within a ball plug hole 144 and held in place with a welded cap 147 in shirttail 115. A seal 128 prevents leakage of lubricant from the bearing surfaces defined between the journal and the cone.

Figure 4:
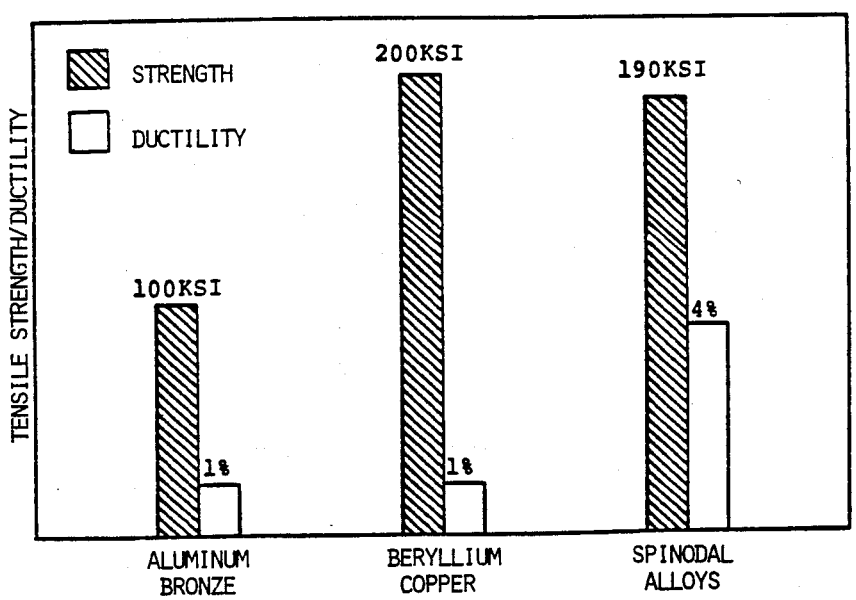
FIG. 4 is a graph comparing the Cu—Ni—Sn spinodal alloy with aluminum bronze and beryllium copper commonly utilized in the rock bit art.

Turning now to FIG. 4, the chart illustrated depicts the tensile strength versus ductility of three different bearing type materials. For example, in the first column, aluminum bronze has a tensile strength of 100KSI and a ductility of 1%. Beryllium copper shows a tensile strength of 200KSI with a 1% ductility factor while the Cu—Ni—Sn spinodal alloy material has a tensile strength of 190KSI with a 4% ductility factor. Clearly then, the Cu—Ni—Sn spinodal alloy material has a greater than or substantially equal tensile strength when compared to aluminum bronze or beryllium copper-with a much higher ductility factor than both, which is advantageous when used as a bearing material, especially in the rock bit art.

Figure 5:
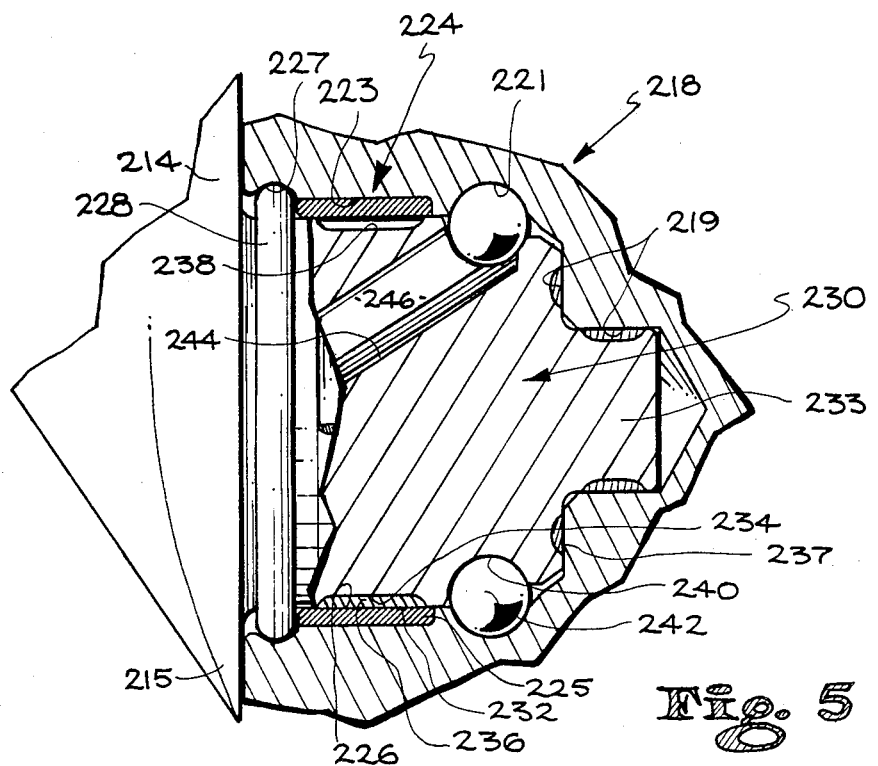
FIG. 5 is a partially broken away cross section of another embodiment of the present invention, illustrating a sleeve of Cu—Ni—Sn spinodal alloy material pressed in a recessed cavity in the cone, the spinodal pressed-in sleeve acting as a bearing against the journal shaft.

Turning now to still a different embodiment, illustrated in FIG. 5, a spinodal material (such as Cu—Ni—Sn) is formed in a right cylinder and generally designated as 224. The cylinder of spinodal material 225 is pressed into an annular recess 223, formed in cone 218. The journal 230 has a channel 234 formed in the journal 30 of FIG. 2. The loaded side 236 of the journal is filled with a hard metal. The unloaded side 238 of the channel 234 provides a grease reservoir for the bearings formed between the journal and the cone. Again, the cone is retained on the journal by a series of cone retention balls 242 that track within races 221 and 240, formed between the cone and the journal. A ball plug 246 secures the balls within their track. The internal diameter 226 of the ring of spinodal material 225 is machined with appropriate bearing tolerances to conform to the bearing surface 232 of the journal 230. The advantages of the embodiment shown in FIG. 5 are obvious in that the spinodal material 225 may be pressed or interference fitted within a complementary channel 223 formed in the cone without metallurgically bonding the ring of spinodal material within the cone.

Figure 6:
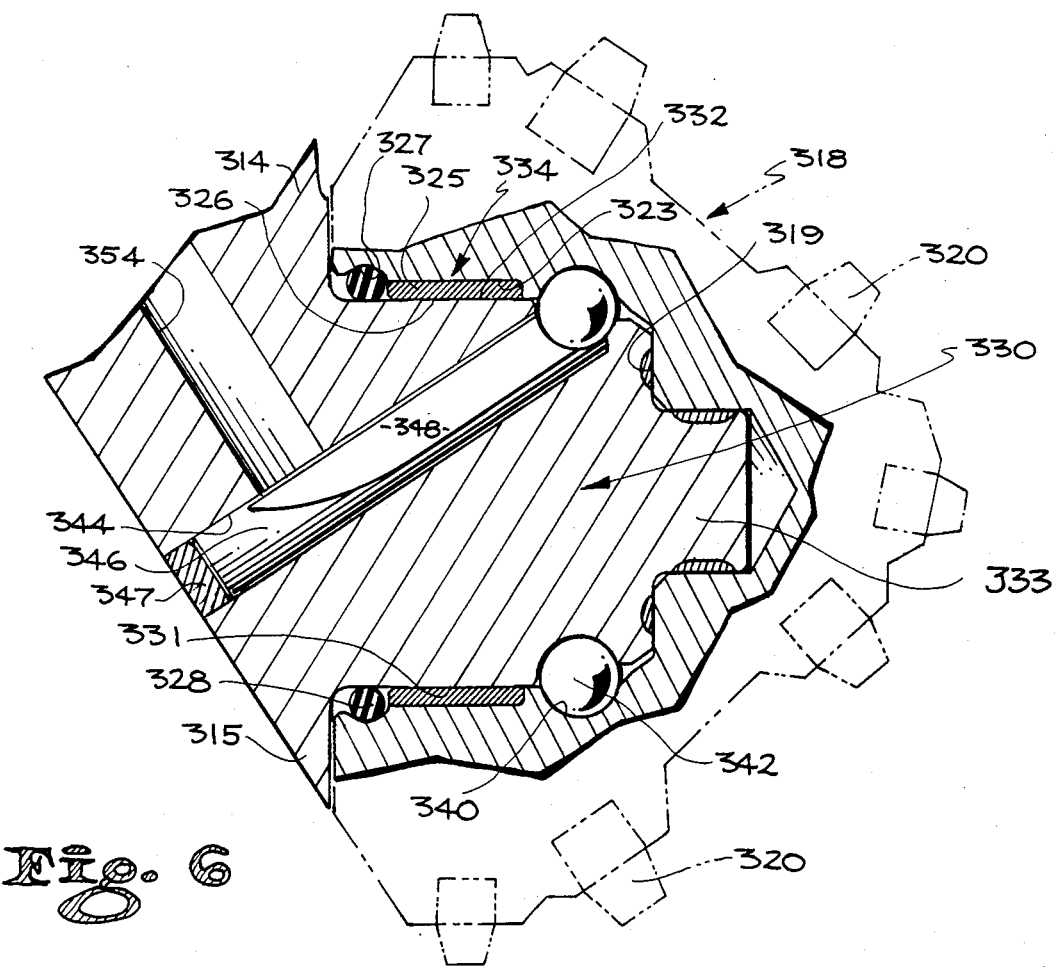
FIG. 6 is a partially broken away cross section of still another embodiment of the present invention wherein a cylindrical ring of Cu—Ni—Sn spinodal material is pressed into a cavity in the cone, the inner surface of the spinodal material acting as a bearing surface against the bearing surfaces formed by the journal bearing.

FIG. 6 is yet another embodiment wherein the same ring of spinodal material, such as Cu—Ni—Sn alloy and generally designated as 324, is pressed within a complementary channel 323 in cone 318. The difference between FIG. 6 and FIG. 5 is that the journal 330 is machined from the basic material of the leg 314 (without the circular track 234, shown in FIG. 5). The inner machine bearing surface 326 in the spinodal material 325 runs against a complementary machined bearing surface 331 of the journal 330. A spindle 333 extends from the end of the journal 330 and mates within a complementary annular recess formed in cone 318. Again, an O-ring 328 is housed within a seal gland 327 formed in the cone 318. The seal acts to retain lubricant within the bearing surfaces formed between the journal and the cone.

Figure 7:
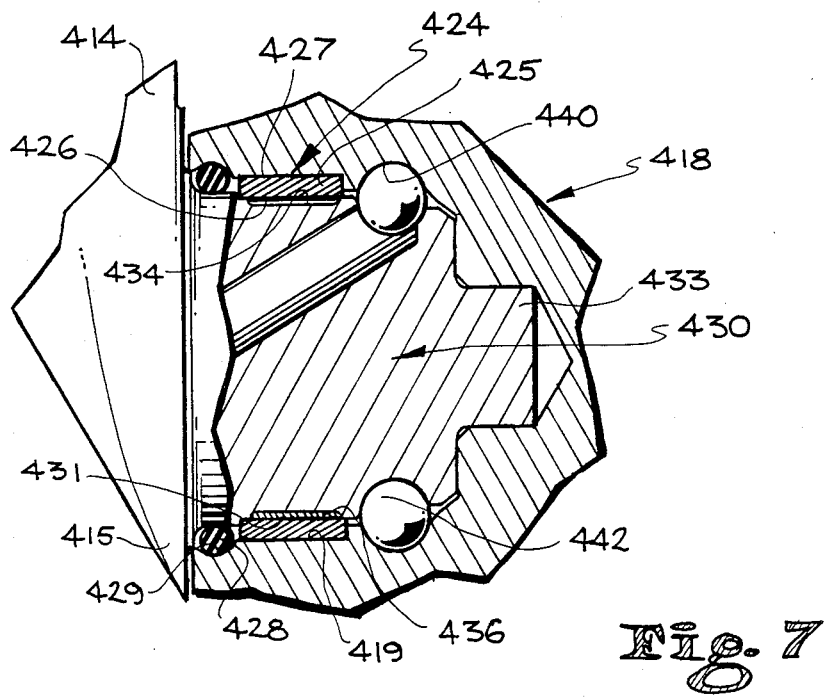
FIG. 7 is yet another embodiment of the present invention wherein a cylindrical floating ring of Cu—Ni—Sn spinodal alloy material is placed between a journal bearing and a bearing surface formed in the rotary cone.
Figure 8:
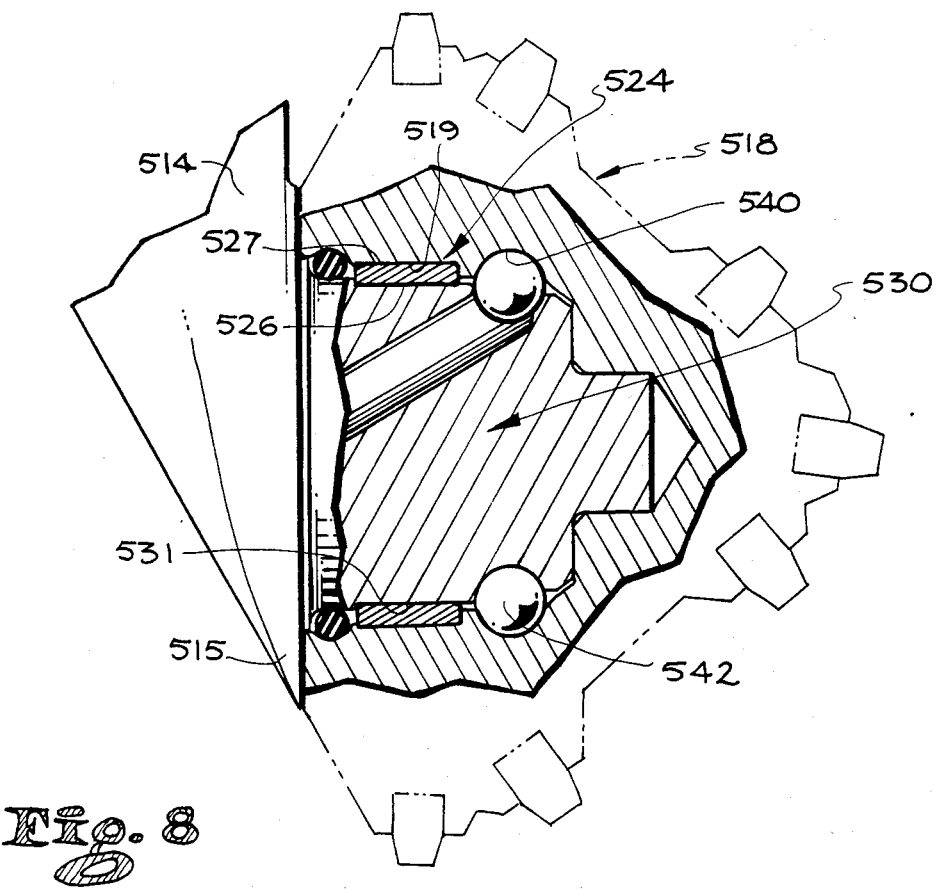
FIG. 8 is still another embodiment of the present invention wherein a floating ring of Cu—Ni—Sn spinodal alloy material is positioned between a bearing surface formed in the cone and a bearing surface formed on the journal.

FIGS. 7 and 8 depict still different embodiments of the present invention. FIG. 7 illustrates a journal bearing 430 with a circumferential groove formed on the surface of the journal, the groove having the hardfacing material on the loaded side of the groove 436 with the open or unloaded side of the groove 438 acting as a lubricant reservoir as heretofore mentioned. A cylindrical floating bearing ring, generally designated as 424, is fabricated from Cu—Ni—Sn spinodal material 425. The inner and outer bearing surfaces 426 and 427 are so machined to act as bearing surfaces between the journal bearing 431 and the cone bearing 419. The ring of spinodal material 425 now acts as a floating ring between the journal and the cone. By utilizing a floating ring of spinodal material, the slip speeds (surface feet per minute) between the cone and the journal are divided by the bearing surfaces 426 and 427 of the ring of spinodal material. Thus, the surface feet per minute is halved between a journal bearing surface and a cone bearing surface when compared to a conventional bearing between a journal and a cone. A series of cone retention balls 442 are nested within ball bearing races 440 in the cone and a similar race in the journal and are retained within their race by means heretofore described. Again, an O-ring 428 is confined within a seal gland 429 in the cone 418.

Finally, FIG. 8 depicts a floating ring, generally designated as 524. The ring of a Cu—Ni—Sn spinodal material 525 floats between a journal bearing 530 and a cone 518. Again, both the inner cylindrical surface 526 and the outer cylindrical surface 527 of the spinodal material 525 acts as a bearing surface between the journal bearing surface 531, formed of the basic material of the journal 530. The hardfacing is absent from the configuration as illustrated in FIG. 8. The cone, again, is being retained by a series of balls 544 within ball races formed between the cone and the journal.

It would be obvious to press or metallurgically bond a ring of Cu—Ni—Sn spinodal material to the journal bearing shafts of FIGS. 3, 6 and 8.

It would additionally be obvious to provide the Cu—Ni—Sn spinodal bearing material to both the cone recess and the journal without departing from the teachings of this invention.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

I claim:

1. A sealed bearing rotary cone rock bit comprising:
   a rock bit body,
   at least one leg depending from said body,
   a journal shaft on said leg,
   a roller cutter cone adapted to be rotatively secured to said journal shaft, and
   bearing surfaces formed by said journal and said cone, one of said bearing surfaces having a corrosion resistant bearing material disposed thereon, said bearing material consisting of copper-based spinodal alloys of about 38 Rockwell C hardness and having a tensile ductility of at least four percent, the other of said bearing surfaces being formed of a material harder than said spinodal alloys.

2. The invention as set forth in claim 1 wherein said copper-based spinodal alloys consist of copper-nickel-tin.

3. The invention as set forth in claim 2 wherein said copper-nickel-tin spinodal alloy contains about 1 percent by weight sulfur.

4. The invention as set forth in claim 2 wherein said copper-nickel-tin spinodal alloy contains a fourth metal selected from the group consisting of iron, zinc, niobium, magnesium, zirconium, chromium, aluminum.

5. The invention as set forth in claim 4 wherein said copper-nickel-tin spinodal alloy contains up to 15 percent by weight of said fourth metal.

6. A sealed bearing rotary cone rock bit comprising:
   a metal rock bit body,
   at least one leg depending from said body,
   a journal shaft depending from said leg,
   a metal roller cutter cone adapted to be rotatively secured to said journal shaft, and
   a corrosion resistant bearing material consisting of copper-nickel-tin spinodal alloys, said bearing material being metallurgically bonded to a cavity formed by said cone, said material having about 38 Rockwell C hardness and having a tensile ductility of at least four percent, said material forming a bearing surface within said cone, said journal shaft consisting of a metal harder than said spinodal alloy.

* * * * *